United States Patent
Grant et al.

(10) Patent No.: US 11,381,042 B2
(45) Date of Patent: *Jul. 5, 2022

(54) SECURITY CONNECTOR

(71) Applicant: InVue Security Products Inc., Charlotte, NC (US)

(72) Inventors: Jeffrey A. Grant, Charlotte, NC (US); Gary A. Taylor, Fort Mill, SC (US); Christopher J. Fawcett, Charlotte, NC (US); Jonathon D. Phillips, Fort Mill, SC (US)

(73) Assignee: InVue Security Products Inc., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/172,659

(22) Filed: Feb. 10, 2021

(65) Prior Publication Data
US 2021/0167558 A1    Jun. 3, 2021

Related U.S. Application Data

(63) Continuation of application No. 16/578,821, filed on Sep. 23, 2019, now abandoned, which is a
(Continued)

(51) Int. Cl.
*H01R 13/66* (2006.01)
*G06F 21/88* (2013.01)
(Continued)

(52) U.S. Cl.
CPC ......... *H01R 13/6683* (2013.01); *G06F 21/88* (2013.01); *G08B 13/1463* (2013.01); *G08B 13/1418* (2013.01); *H01R 13/6397* (2013.01)

(58) Field of Classification Search
CPC . G06F 21/88; G08B 13/1418; G08B 13/1463; H01R 13/6397; H01R 13/6585; H01R 13/6683
See application file for complete search history.

(56) References Cited

U.S. PATENT DOCUMENTS 4,700,131 A    10/1987  Miller
5,821,868 A    10/1998  Kuhling
(Continued)

OTHER PUBLICATIONS

Jack Purcher, "Apple Electro-Optical Connector Patents Surface that may Point to 'Lightning's' Road Map", Apr. 11, 2013, pp. 1-9, see website located at http://www.patentlyapple.com/patently-apple/2013/04/apple-electro-optical-connector-patents-surface-that-may-point-to-lightnings-road-map.html, Patently Apple, USA.

*Primary Examiner* — Adnan Aziz
(74) *Attorney, Agent, or Firm* — InVue Security Products Inc.

(57) ABSTRACT

In one example, the connector includes a body portion configured to be connected to a cord and a connection portion engaged with the body portion and comprising a plurality of conductors. The connection portion includes a conductive shield electrically connected to a plurality of the conductors when the connection portion is not engaged with the article of merchandise, and the connection portion also includes at least one ground conductor that is not electrically connected to the remaining conductors and/or the conductive shield when the connection portion is not engaged with the article of merchandise. At least one of the conductors and/or the conductive shield is configured to cooperate with the ground conductor to define a sense loop when the connector is engaged with the article of merchandise, and interruption of the sense loop is indicative of a security event.

13 Claims, 4 Drawing Sheets

Related U.S. Application Data continuation of application No. 14/267,420, filed on May 1, 2014, now Pat. No. 10,424,882.

(60) Provisional application No. 61/834,003, filed on Jun. 12, 2013, provisional application No. 61/821,568, filed on May 9, 2013, provisional application No. 61/821,538, filed on May 9, 2013.

(51) Int. Cl.
*G08B 13/14* (2006.01)
*H01R 13/639* (2006.01)

(56) References Cited

U.S. PATENT DOCUMENTS

| | | | |
|---|---|---|---|
| 6,077,122 A * | 6/2000 | Elkhatib | H01R 13/5837 439/417 |
| 6,099,351 A * | 8/2000 | Wu | H01R 12/725 439/541.5 |
| 6,147,603 A | 11/2000 | Rand | |
| 6,150,940 A | 11/2000 | Chapman et al. | |
| 6,570,502 B2 | 5/2003 | Matsuo | |
| 7,710,266 B2 | 5/2010 | Belden, Jr. et al. | |
| 7,737,846 B2 | 6/2010 | Belden, Jr. et al. | |
| 8,517,748 B1 | 8/2013 | Kelsch et al. | |
| 9,142,898 B2 | 9/2015 | Guo | |
| 9,830,788 B1 | 11/2017 | Kelsch et al. | |
| 10,410,488 B2 | 9/2019 | Phillips et al. | |
| 10,424,882 B2 | 9/2019 | Grant et al. | |
| 2005/0073413 A1 * | 4/2005 | Sedon | G08B 13/149 340/568.8 |
| 2006/0145848 A1 | 7/2006 | Marsilio et al. | |
| 2007/0001845 A1 * | 1/2007 | Ott | G08B 13/149 340/568.1 |
| 2009/0267766 A1 | 10/2009 | Pasma | |
| 2012/0272297 A1 | 10/2012 | Lydon | |
| 2012/0307436 A1 * | 12/2012 | Dickens | G06F 21/85 361/752 |
| 2013/0087690 A1 | 4/2013 | Sloey et al. | |
| 2013/0089290 A1 | 4/2013 | Sloey et al. | |
| 2013/0115817 A1 | 5/2013 | Terlizzi et al. | |
| 2013/0115821 A1 | 5/2013 | Golko et al. | |
| 2013/0117470 A1 | 5/2013 | Terlizzi et al. | |
| 2013/0194096 A1 * | 8/2013 | Belden, Jr. | G08B 13/1463 340/568.4 |
| 2014/0035730 A1 | 11/2014 | Grant et al. | |
| 2020/0021066 A1 | 1/2020 | Grant et al. | |

* cited by examiner

SECURITY CONNECTOR

CROSS REFERENCE TO RELATED APPLICATIONS

The present application is a continuation of and claims priority to U.S. application Ser. No. 16/578,821, filed on Sep. 23, 2019, which is a continuation of and claims priority to U.S. application Ser. No. 14/267,420, filed on May 1, 2014, and now U.S. Pat. No. 10,424,882, which is a non-provisional of and claims the benefit of priority to U.S. Provisional Application No. 61/821,538 filed on May 9, 2013, U.S. Provisional Application No. 61/821,568 filed on May 9, 2013, and to U.S. Provisional Application No. 61/834,003 filed on Jun. 12, 2013, the entire disclosures of which are incorporated herein by reference in their entireties.

FIELD OF THE INVENTION

Embodiments of the present invention relate generally to connectors for electronic devices, including connectors for securing electronic devices from theft.

BACKGROUND OF THE INVENTION

Retailers routinely display articles of merchandise, such as portable computers (e.g. notebooks, laptops, tablets, etc.), mobile phones, e-readers, media players, and the like for customers to evaluate before making a purchase. These articles of merchandise are continually being made smaller and lighter in weight due to advances in technology and materials. As a result, such merchandise is increasingly vulnerable and susceptible to theft. At the same time, the retail price and profit margin for such merchandise continues to decline. Accordingly, these articles of merchandise need to be secured by a security device that effectively and cost efficiently protects the merchandise from theft.

It is common in the retail security industry to have electronic devices tethered to a store fixture to prevent theft yet allow a customer to interact with the device. In addition, it is desirable to provide power to the electronic device so that the device may be charged and operable for use by a potential customer. Some manufacturers provide proprietary connectors that are incapable of providing security to an electronic device. Therefore, there is a need for improved connectors that are capable of providing both power and security to the electronic device without affecting the existing functionality of the connector.

BRIEF SUMMARY OF THE INVENTION

Embodiments of the present invention are directed to connectors, cable assemblies, systems, and methods for providing security to an article of merchandise. In one embodiment, a connector includes a body portion configured to be connected to a cord, a connection portion engaged with the body portion, and a plurality of conductors. The connector also includes a conductive shield electrically connected to a plurality of the conductors when the connection portion is not engaged with the article of merchandise. At least one of the plurality of conductors is not electrically connected to the remaining conductors and/or the conductive shield when the connector is not engaged with the article of merchandise. The at least one conductor is configured to cooperate with at least one of the plurality of conductors and/or the conductive shield to define a sense loop when the connector is engaged with the article of merchandise. In addition, interruption of the sense loop is indicative of a security event.

In another embodiment, a cable assembly is provided. The cable assembly includes a connector as described above along with a cord configured to be electrically connected to the connector.

In a further embodiment, a method is provided. The method includes engaging a connector to an article of merchandise for providing power and data signals therebetween. The connector includes a plurality of conductors and a conductive shield electrically connected to a plurality of the conductors when the connector is not engaged with the article of merchandise. The connector also at least one conductor that is not electrically connected to the remaining conductors and/or the conductive shield when the connector is not engaged with the article of merchandise. At least one of the conductors and/or the conductive shield cooperates with the at least one conductor to define a sense loop when the connector is engaged with the article of merchandise.

In yet another embodiment, a system is provided and includes a controller, a cord configured to operably engage the controller, and a connector. The connector includes a body portion configured to be connected to the cord and a connection portion engaged with the body portion. The connector also includes a plurality of conductors electrically connected to the cord, which includes at least a ground conductor, a power conductor, and a signal conductor. The connector further includes a conductive shield configured to electrically connect to the article of merchandise when the connection portion is engaged with the article of merchandise. At least the ground conductor and the signal conductor are not electrically connected to the conductive shield when the connector is engaged with the article of merchandise. The signal conductor is configured to transmit a signal when the connector is engaged with the article of merchandise, and the controller is configured to detect a change in the signal that is indicative of a security event.

DETAILED DESCRIPTION OF EMBODIMENTS OF THE INVENTION

Figure 1:
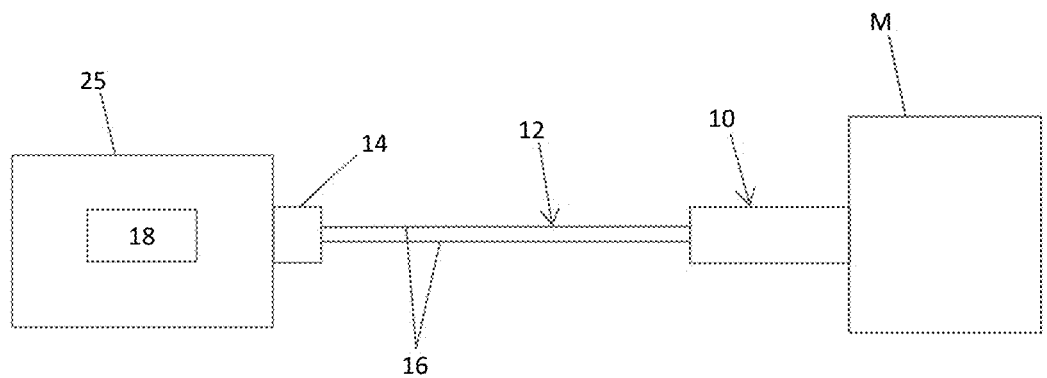
FIG. 1 is a schematic of a security system according to one embodiment of the present invention.

Embodiments of the present invention will now be described more fully hereinafter with reference to the accompanying drawings, in which exemplary embodiments of the invention are shown. This invention may, however, be embodied in many different forms and should not be construed as limited to the embodiments set forth herein. Rather, the exemplary embodiments are provided so that this disclosure will be thorough and complete, and will fully convey the scope of the invention to those skilled in the art.

Reference will now be made to the accompanying drawing figures wherein identical reference numerals denote the same or similar elements throughout the various views. One or more embodiments of a connector 10 for securing an article of merchandise "M" from theft are described below. Some manufacturers manufacture proprietary connectors that are only compatible with the manufacturer's articles of merchandise. Such proprietary connectors may be used to ensure that the article of merchandise is not damaged due to differences in power requirements or mechanical mismatch. Some proprietary connectors may be "smart" and provide additional functionality beyond simply passing through electrical signals. For example, the proprietary connector may be configured to transmit data and electrical signals for authenticating that the article of merchandise is compatible with the connector.

However, such proprietary connectors have certain limitations in view of providing security from theft. In this regard, some proprietary connectors do not allow for a sense loop for detecting an unauthorized removal of the connector. In addition, although the connectors are "smart" in the sense that the connectors can communicate with the article of merchandise, such smart connectors may be prone to false alarms. Namely, should the article of merchandise be powered off by a user, the connector is incapable of differentiating between an intentional power off or whether the article of merchandise has been removed from the connector in an authorized manner. Furthermore, should the article of merchandise power down for power conservation, the connector will again be incapable of distinguishing between an intentional power down or an attempted theft. Therefore, embodiments of the present invention facilitate security capability of proprietary or other "smart" connectors while maintaining the existing functionality of the connector.

The article of merchandise M may be a display model or an operational sample of electronic merchandise, such as portable computers (e.g. notebooks, laptops, tablets, etc.), e-readers, mobile phones, smart phones, media players, and the like, for a customer to examine before making a decision to purchase the item. The article of merchandise M may be typically displayed in a manner that permits a prospective purchaser to evaluate the operation and features of the merchandise, while protecting the merchandise from a potential thief. A power cord or tether 12 may be operably engaged with the article of merchandise M at one end, and according to one embodiment, a security event (e.g., removal, cutting, or tampering of the power cord) may result in the generation of a security signal (e.g., an audible and/or visual alarm). For example, the power cord 12 may be operably engaged with an alarm device 25 configured to generate a security signal upon detecting a security event. In one embodiment, the power cord 12 includes a connector 14 configured to operably engage an alarm device 25 (see, e.g., FIG. 1).

Embodiments of the present invention provide for the delivery of at least power to the article of merchandise M on display through a power cord, cable, or the like. The power cord 12 may include a plurality of conductors 16. For example, a pair of conductors 16 in the power cord 12 (e.g., a positive power line and a ground line) may provide power to the article of merchandise M. An input power source or controller 18 may be in electrical communication with the power cord for transmitting power and other signals through the cord 12 and to the article of merchandise M. The power cord 12 may include additional conductors 16 if desired, such as for transmitting data, audio, video, optical and/or communication signals. Moreover, in one embodiment, the power cord 12 includes at least one conductor 16 for transmitting a security signal. For example, the power cord 12 may include a plurality of conductors 16, one of which for transmitting a signal to the connector 10, and a second conductor for returning the signal back through the power cord. Should the signal be disrupted (e.g., the cord 12 is removed or cut), a security signal may be generated. For instance, an audible and/or a visible signal may be generated. In addition, the functionality of the article of merchandise M may be interrupted and locked from further use without being overridden by an authorized user, such as by inputting a passcode or using an appropriate key.

One end of the power cord 12 includes a connector 10 configured to electrically couple to the article of merchandise M. The opposite end of the power cord is configured to be coupled to a power source 18, such as a USB-port on another electronic device or an electrical outlet. Thus, the power cord 12 may include a USB connector or the like that is electrically connected to the connector 10 at the opposite end of the cord. In other embodiments, the power cord 12 may be electrically coupled to an alarm device 25 or sensor, as explained in further detail below. The connector 10 is configured to provide at least power and security signals to the article of merchandise. In some embodiments, the connector 10 is similar to those disclosed in U.S. Patent Publ. No. 2012/0272297, entitled Cross-Transport Authentication and filed Jun. 29, 2012, U.S. Patent Publ. No. 2013/0089290, entitled Hybrid Optical Connector and filed Nov. 29, 2012, and U.S. Patent Publ. No. 2013/0087690, entitled Optical Connection of Devices and filed Nov. 29, 2012, U.S. Patent Publ. No. 2013/0117470, entitled Techniques for Configuring Contacts of a Connector and filed Nov. 16, 2012, U.S. Patent Publ. No. 2013/0115821, entitled Dual Orientation Connector with External Contacts and Conductive Frame and filed Nov. 16, 2012, and U.S. Patent Publ. No. 2013/0115817, entitled Techniques for Configuring Contacts of a Connector and filed Nov. 16, 2012, each of which is incorporated by reference herein in its entirety.

Figure 2:
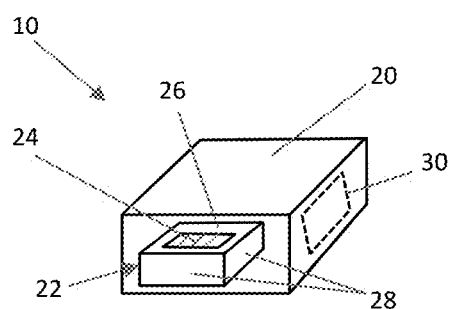
FIG. 2 is a perspective view of a connector according to an embodiment of the present invention.

Generally, the connector 10 may include a body portion 20 and a connection portion 22 extending outwardly therefrom (see, e.g., FIG. 2). The body portion 20 and connection portion 22 may be separate members coupled to one another or integrally formed as a single component. Although the body portion 20 and the connection 22 portion may be various sizes and configurations, the connection portion is illustrated as having a smaller cross-sectional dimension than the body portion. The power cord 12 is coupled to the body portion 20, while the connection portion 22 is configured to be inserted within an input port of the article of merchandise M so as to be electrically connected thereto. The body portion 20 may be hard wired to the power cord 12 or connected using a suitable releasable coupling. The connection portion 22 comprises a plurality of conductors 24, contacts, or pins that correspond to the conductors 16 in the power cord, as discussed above. The connection portion 22 may include any number of conductors 24, such as 2, 4, 6, 8, etc. The conductors 24 may be embedded within or otherwise integrated within a conductive shield 26 and extend from a first surface of the shield to a second opposite surface such that the conductors are exposed on both the first and second surfaces. Thus, the shield 26 may surround the conductors 24 and form an outer surface of the connection portion 22. An outer perimeter 28 of the shield 26 extending between the first and second surfaces may also surround the conductors 24 and include a conductive material that is electrically connected to the conductive shield. The outer perimeter 28 may include one or more engagement features (e.g., recesses) that facilitate engagement with corresponding engagement features in the input port of the article of merchandise M. In one embodiment, the conductive shield 26 and outer perimeter 28 are a conductive metal material. The shield 26 and/or body portion 20 may house a processor 30 for communicating with the article of merchandise M. The processor 30 may be configured to perform a variety of functions, such as authenticating that the connector is compatible with the article of merchandise. The processor 30 could also be configured to detect the orientation of the connector 10. In this regard, the connector 10 may be bi-directional in that the connector may be inserted into an input port of the article of merchandise M in a first orientation and a second opposite orientation, which is unlike conventional USB and micro-USB connectors. For example, the connector 10 may be inserted in orientations 180 degrees opposite from one another. The processor 30 may, in turn, detect the orientation of the connector so that the electrical signals may be routed to the proper conductors in the connection portion.

Figure 3:
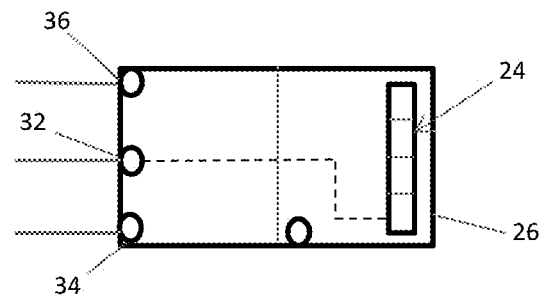
FIG. 3 is a top schematic view of a circuit defined by a connector according to one embodiment of the present invention.

The connector 10 is further configured to facilitate detection of a security event, such as removal or cutting of the power cord 12. In this regard, FIG. 3 shows an embodiment of a connector 10 that includes a ground conductor 32 that is not electrically connected to a first conductor 34 (e.g., for transmitting an input sense signal), the shield 26, or any other conductors 24 in the connection portion 22 when the connector is not connected to the article of merchandise M. The first conductor 34 may be one of the conductors 24 integrated into the conductive shield 26 or could be a separate conductor coupled to the shield (e.g., via soldering). When the connector 10 is inserted within the input port of the article of merchandise M, the ground conductor 32 becomes electrically connected to the first conductor 34, another conductor(s) 36 in the connector, and/or the conductive shield 26 due to interaction with the conductors of the input port, thereby completing an electrical circuit. In other words, the conductive shield 26 and/or at least one other conductor is shorted to the ground conductor 32. As noted above, the power cord 12 may include a plurality of conductors 16, one of which is for transmitting a signal to the connector 10 (e.g., via the first conductor 34), and a second conductor for returning the signal back through the power cord (e.g., via the ground conductor 32). As long as the connector 10 is electrically connected to the article of merchandise M, the sense loop through one conductor 34 and the ground conductor 32 is uninterrupted. Should the sense loop be disrupted (e.g., the cord 12 is removed or cut), a security signal may be generated. Thus, as soon as the connector 10 is removed from the article of merchandise M, the shorted conductors would open, resulting in the generation of a security signal. FIG. 3 also shows that the connector 10 includes a conductor 36 that allows power to be provided to the connector, which may be used to provide power to the article of merchandise M. Thus, the article of merchandise M may be charged via the connector 10.

The input port of the article of merchandise M may include a plurality of conductors, pins, or contacts that are configured to electrically connect to corresponding conductors 24 on the connection portion 22 and/or conductive shield 26 when the connection portion is engaged with the input port. In one embodiment, the input port includes a plurality of conductors that are configured to electrically connect to the conductors 24 and/or the conductive shield 26 of the connector. For example, the input port may include a pair of conductors connected to a common ground, with one conductor configured to electrically connect to the ground conductor 32 of the connector and the other conductor 34 configured to electrically connect to the conductive shield 26 or one or more of the remaining conductors 36 of the connector. As such, coupling the connector 10 with the input port results in each of the conductors 24 of the connector (including the ground conductor 32), the conductive shield 26, and the article of merchandise M to be in electrical communication with one another.

In some embodiments, the power cord 12 is coupled to an alarm device 25 or sensor. For instance, the power cord 12 may electrically connect an alarm device 25 or sensor to the article of merchandise M. Thus, upon the occurrence of a security event, the alarm device 25 may include circuitry for detecting the security event and generating an appropriate security signal. For example, the alarm device 25 may be similar to those manufactured by InVue Security Products Inc. For example, the alarm device may include a display module or mounting member configured to removably support the article of merchandise M, as well as provide power and security to the article of merchandise. According to some embodiments, the alarm device may be similar to those disclosed in U.S. Pat. No. 7,710,266, entitled Security System with Product Power Capability and issued May 4, 2010, and U.S. Pat. No. 7,737,843, entitled Programmable Alarm Module and System for Protecting Merchandise and issued Jun. 15, 2010, each of which is incorporated by reference herein in its entirety. Moreover, the alarm device 25 could be integrated with an input power source or controller 18, such as for providing and/or receiving power and/or security signals from the connector 10 and/or the article of merchandise M.

Embodiments of the present invention provide advantages over similar connectors that may otherwise be incapable of providing security to the article of merchandise. This functionality is advantageous in a retail environment where articles of merchandise are on display for inspection by a customer. As discussed above, some proprietary connectors include conductive materials that do not enable a security signal to be transmitted through the connector since the ground conductor is always electrically connected to the conductive shield and/or other conductors. Thus, a sense loop is not possible with some current connector designs since there is no means to detect an interruption in the sense loop. By decoupling at least one conductor of the sense loop from the other conductors and/or the conductive shield, the ability to provide a sense loop is provided, thereby providing security capability. Furthermore, the sense loop is uninterrupted when the device is powered down thereby reducing the incidence of false alarm. The functionality of the connector is also unaffected. As such, proprietary connectors including "smart" functionality are not affected by the presence of the sense loop.

In another embodiment of the present invention, a connector 10 is configured to interact with the article of merchandise M to define a sense loop and detect any interruptions in the sense loop indicative of a security event. The existing structure of a proprietary connector may be used in this manner without the need to modify the existing conductor arrangement. For example, when the connector 10 is engaged with the article of merchandise M, particular contacts or pins on the connector may interact with the article of merchandise to establish communication therebetween. A proprietary connector may establish communication with the article of merchandise M when the connector is engaged with the article to verify that the article is compatible with the connector. When such engagement is detected, the connector 10 may be configured to communicate signals or pings to the article of merchandise M (e.g., via cord 12 or alarm device). As long as the connector 10 is sending and receiving the signals with the article of merchandise M, the sense loop is complete and uninterrupted. Should a return signal not be received by the connector 10 after sending the signal, the interruption may be indicative of a security event. It is understood that such signals may be one-way based communication between the connector 10 and the article of merchandise M and/or through one or more of the conductors 16, 24 provided in the connector and the power cord 12, respectively. In one example, a signal strength in the article of merchandise M may be monitored, wherein one or more of the conductors may function as an antenna. In another example, noise in the power cord 12 could be monitored while the connector 10 is engaged with the article of merchandise, and should the noise be interrupted for a particular period of time, this interruption may be indicative of a security event. Other possible detectable signals could be transmitted through one or more of the conductors 16, 24 in the connector 10 and/or power cord 12 to define a sense loop. Alternatively, vibrations or sound waves could be sent up the power cord 12 and to the connector 10. Changes in vibration or sound could be detected depending on whether the connector 10 is engaged with or disengaged from the article of merchandise M.

The aforementioned technique is useful when the connector 10 is engaged with the article of merchandise M and communicating with the article (e.g., transmitting and/or receiving data). In the instance where the connector 10 is not communicating data signals with the article of merchandise M (e.g., when the article is turned off), the connector may be in electrical communication to charge the article (e.g., via the power cord). Thus, as long as the article of merchandise M is being charged via engagement with the connector, a sense loop may be established. In one embodiment, the article of merchandise M may never be fully charged such that there is always the ability to establish a sense loop via charging of the article, even when the article is turned off. Thus, techniques may be employed to monitor the power level of the article of merchandise M and to limit the amount of power delivered to the article of merchandise. In one embodiment, this may be accomplished by limiting the power provided to the article of merchandise M to a trickle charge or cycling the power delivery at a rate that would not fully charge the article. For example, the article of merchandise M could be charged for a predetermined period of time and then stop charging, the power level of the article could then be determined. Where the power level is above a predetermined power level (e.g., greater than 70%), no additional charging would occur. However, where the power level is below a predetermined power level, additional charging may occur, and the cycle may continue.

In a further embodiment, the connector 10 may comprise an adaptor, a switch, a sensor, or other mechanism for detecting interaction with the article of merchandise. The adaptor may be coupled to the connector such that the interaction between the connector 10 and the article of merchandise M is detected, thereby enabling communication via the adaptor. For example, the adaptor could be an antenna that senses the engagement and/or communication between the connector and the article of merchandise. In other embodiments, the interaction may be used to establish or interrupt a sense loop.

A further embodiment of the connector 10 provides for proximity detection. For instance, the connector 10 may include an optical or a proximity sensor that is configured to detect the engagement of the connector and the article of merchandise M. The sensor may be disposed inline between the connector 10 and the article of merchandise M such that the sensor is configured to detect the connection therebetween. This connection may be due to physical interaction between the connector 10 and the article of merchandise M or based on a proximity therebetween. For example, the sensor may be configured to emit a signal or ping (e.g., a resonant echo) that is indicative of a particular article of merchandise M. The sensor may be engaged, integrated, molded, or otherwise coupled to the connector 10, such as to the connection portion or the body portion.

Figure 4:
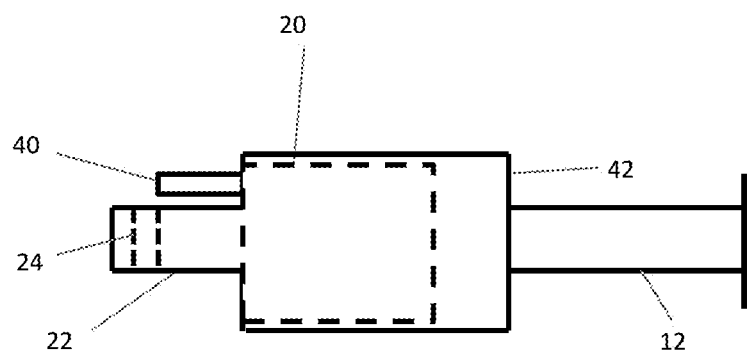
FIG. 4 is a side schematic view of a connector according to an embodiment of the present invention.

In one embodiment, the sensor is a plunger activated device 40, such as an inline plunger switch operably engaged with the connector 10 (see, e.g., FIG. 4). Thus, the plunger switch 40 is configured to engage the article of merchandise M when the connector 10 is connected thereto. Upon disconnection of the connector 10, the plunger switch 40 also disengages the article of merchandise M. The disengagement and engagement of the plunger switch 40 is operable to actuate a switch within the connector 10. In this regard, actuation of the plunger switch 40 may complete a sense loop by closing a switch within the connector 10, thereby creating a sense loop through the cord 12. The switch within the connector 10 could be any suitable switch for completing a circuit, such as a mechanically actuated member or an optically actuated member. The connector 10 may include overmolding 42 applied to the connection portion 22 to thereby define the body portion 20, or the overmolding may be applied over the body portion. The overmolding 42 may be configured to allow the connection portion 22 to be inserted into the article of merchandise M in a particular orientation or direction.

Figure 5:
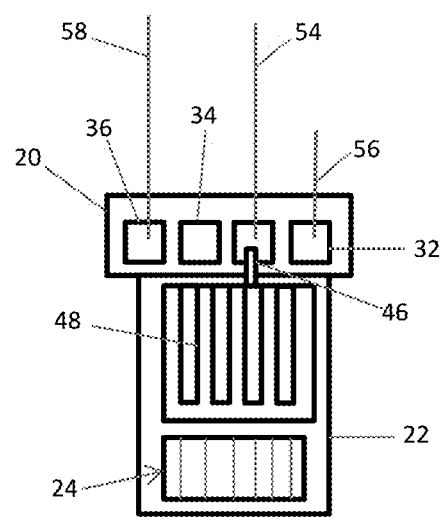
FIG. 5 is a top schematic view of a connector according to an embodiment of the present invention.
Figure 6:
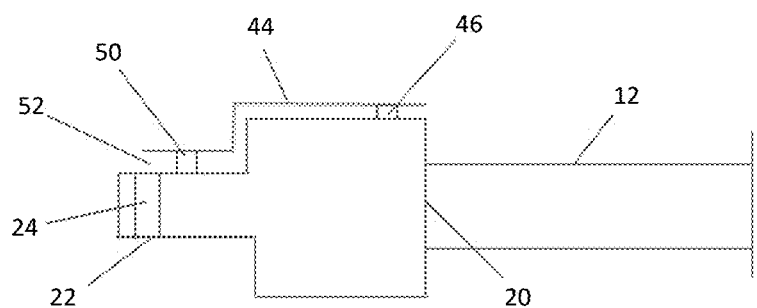
FIG. 6 is a side schematic view of a connector according to an embodiment of the present invention.

In some embodiments, the sensor is a flexible circuit 44 (see, e.g., FIG. 6). The flexible circuit 44 may be directly coupled to the connector 10. The flexible circuit 44 may have a low profile that does not interrupt the insertion of, or connection between, the connection portion 22 and the article of merchandise M. The flexible circuit 44 may be disposed at least partially along the body portion 20 and the connection portion 22. In this regard, the flexible circuit 44 may be electrically coupled to the body portion 20 or the connection portion 22, such as via one contact 46 (e.g., solder point). The flexible circuit 44 may include one or more electrically conductive fingers 48 or elements that extend from the body portion 20 and along the connection portion 22. The fingers 48 may be initially spaced away from the surface of the connection portion 22 so as to not be in electrical communication therewith. For instance, an adhesive, dielectric member, spacer, or other element 50 or technique may be used to create a gap 52 between the fingers 48 and the connection portion 22 prior to insertion of the connection portion (see, e.g., FIG. 5). The element or member 50 creating the gap 52 may be flexible or resilient to allow the fingers 48 to move when the connection portion 22 is inserted in the article of merchandise M. Where an adhesive is employed, the adhesive may be used to further secure the flexible circuit 44 to the connector 10. In addition, the element or member 50 creating the gap 52 may be configured to bias the flexible circuit 44 away from the connection portion 22 when the connection portion is removed from the article of merchandise M. Alternatively, the flexible circuit 44 may have a tendency to naturally bias away from the connection portion 22 when the connector 10 is disengaged from the article of merchandise M. When the connection portion 22 is inserted in the article of merchandise M, the fingers 48 may be flexible and configured to extend towards the connection portion 22 and make contact therewith thereby being in electrical communication with the connection portion. The electrical communication may be facilitated by electrical contact being made between the connection portion 22 and the article of merchandise M (e.g., via the shield 26 of the connection portion). When electrical communication is established, a sense loop may be created. For instance, a sense loop may be created between a sense wire 54 coupled to a contact 46 of the flexible circuit and a ground wire 56 engaged with the connector (see, e.g., FIG. 5). The electrical connection between the two wires 54, 56 may be facilitated by electrical contact being made between the article of merchandise M and the connection portion 22 (e.g., via the shield 26). When the connection portion 22 is removed or the cord 12 is cut, the sense loop is interrupted, which may result in generation of a security signal. The flexible circuit 44 could be any suitable material, whereby a conductive material (e.g., copper or silver) is coupled to a non-conductive material (e.g., polyester). The flexible circuit 44 may only be disposed on one surface of the connector 10. As noted above, the connector 10 may include an overmolding 42 configured to allow the connection portion 22 to be inserted in the article of merchandise M in a particular orientation or direction. As such, the connection portion 22 may be inserted in one direction that ensures that the flexible circuit 44 completes a circuit for creating a sense loop in the cord 12. The overmolding could be applied over the body portion 20, including the contact 46 of the flexible circuit 44, to also facilitate attachment therebetween. FIG. 5 also shows that a third wire 58 may be used to electrically connect to one of the conductors 24 in the connector (e.g., conductor 36) that allows power to be provided to the connector, which may be used to provide power to the article of merchandise M.

Figure 7:
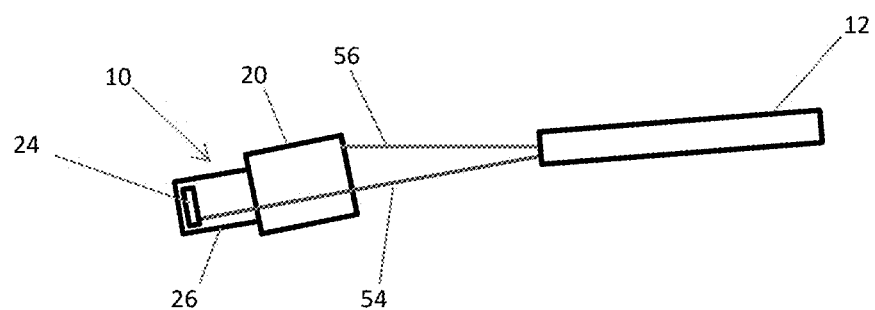
FIG. 7 is a top schematic view of a connector according to an embodiment of the present invention.

In another embodiment, the connector 10 utilizes the ability of the article of merchandise M to detect the presence of the connector to create a sense loop (see e.g., FIG. 7). In this regard, when the connection portion 22 is inserted within the article of merchandise M, the article may be configured to transmit power to the connection portion to power a processor 30 disposed within the connector. For example, about 3 volts may be provided to the connector 10 from the article of merchandise M. Power is provided to the connector 10 while the connector is operably engaged with the article of merchandise M in order to allow the processor 30 to communicate with the article. Power may be continuously provided to the connector 10, even when the article of merchandise M is in a sleep mode. Moreover, circuitry may be provided to continue the power transmission even when the article of merchandise M is powered down, such as by cycling the power of the article of merchandise. For instance, the alarm unit 25 may include such circuitry for communicating with the article of merchandise M via the cord 12 and connector 10. When the power is transmitted from the article of merchandise M to the connector 10, a sense loop may be defined, and an interruption in the sense loop may be detected when the connector is removed from the article or when the cord 12 is cut or removed. In order to utilize this technique, one of the conductors 24 of the connection portion 22 may be chosen to be electrically connected to a sense wire 54 in the cord 12. This conductor 24 would correspond to the conductor in which power is provided to the connector from the article of merchandise M. When power is transmitted from the article M to the connector 10, the power will be conducted through this conductor 24 and the wire 54. A second wire 56 (e.g., a ground wire) in electrical communication with the connector 10 may be configured to complete the sense loop.

In one embodiment, a sensor is configured to shunt the connector 10 to provide for a sense loop via the conductors 24, 16 in the connector and the cord 12. For example, where the connector 10 is capable of engaging the article of merchandise M in multiple orientations as discussed above (e.g., the connector is bidirectional), the sensor may be coupled to one surface of the connector 10 while another surface is capable of establishing communication between the connector and the article of merchandise M. Because the sensor is also electrically connected to the connector 10, engagement of the connector and the article of merchandise M also provides for electrical communication with the sensor. Thus, a sense loop may be provided via the sensor and through one or more of the conductors 24, 16 in the connector 10 and/or power cord 12. As such, the connector 10 may be configured to engage the article of merchandise M in one direction so that the sensor is able to establish a sense loop. Such a configuration for unidirectional alignment may be accomplished, for instance, via a suitable design of the body portion 20 of the connector (e.g., overmolding the body portion).

In additional embodiments, the connector 10 may include a mechanism that is configured to shunt or short one or more electrical contacts on the connector. Thus, should the connector 10 be unplugged from the article of merchandise M, the electrical interaction of the mechanism and the connector could be detectable. For example, the mechanism could be spring loaded, such that the mechanism is automatically actuated when the connector 10 is removed from the article of merchandise M, thereby shorting the connector and resulting a signal being generated that is indicative of the connector being removed.

In one embodiment, the connector 10 comprises a mechanism that is configured to actuate upon removal of the connector from the article of merchandise M. For example, the connector 10 may include a floating connector, loose joint, or "turtle head" feature that facilitates movement relative to the connector when the connector is engaged with and disengaged from the article of merchandise M. In this regard, the connector 10 may include a housing that is held relative to the connection portion 22 such that the housing is movable to a first position when the connector is engaged with the article of merchandise M and movable to a second position when the connector is disengaged. Such engagement and disengagement may cause a sense loop to be completed or interrupted depending on the arrangement of the housing. Or, the movement of the housing may result in shorting of one or more conductors 24 in the connector 10. For instance, the housing may be retracted relative to the connector 10 when the connector is engaged with the article of merchandise M. When the connector 10 is removed, the housing is able to again move relative to the connector which causes a short of the connector and is indicative of the connector being removed from the article of merchandise M. Thus, the connector 10 may be configured to generate a detectable signal when such a short occurs, which may in turn be indicative of a security event.

In another embodiment, other techniques may be employed to detect that the connector 10 has changed states with respect to the article of merchandise M. For instance, the connector 10 may include an orientation sensor that is configured to detect a change in orientation (e.g., using torsional bias) that may be indicative of a security event. In this regard, a change in orientation could correspond to an unauthorized user moving the article of merchandise M in a manner that is indicative of a security event (e.g., placing the article in one's pocket). The orientation sensor could also be used in conjunction with a timing mechanism wherein the change in orientation would be monitored for a given time period. Detecting a particular change in orientation beyond a predetermine period of time may be indicative of a security event, such as where the orientation is unchanged relative to a "home" orientation or an orientation that is indicative of "normal" use or inspection.

In another embodiment, the article of merchandise M may include a software application for recognizing interaction between the connector 10 and the article of merchandise. In this regard, the software may be configured to establish a wireless communication signal when the connector 10 is unplugged from the article of merchandise M, which may be indicative of a security event. The wireless signal may be communicated to a central location or an alarm device that monitors the connection between the connector 10 and the article of merchandise M. Various wireless protocols may be employed to effectuate such communication, such as Bluetooth 4.0, WiFi, etc. Moreover, the power level of the article of merchandise M may also be monitored such that a sudden drop or interruption in the power level may also trigger wireless communication to a central location or an alarm device. In order to prevent swapping of the article of merchandise M with another article, the software may be further configured to detect the identification of the article coupled to the connector 10, such as via conductors 24 through the connector and cord 12 when plugged in or via a wireless signal. Thus, the power level and/or the identification of the article of merchandise M may be monitored for detecting a security event where the power level is interrupted and/or the identification of the article changes.

In some embodiments, one or more conductors (e.g., the ground conductor 32 and one or more data or signal conductors) in the connector 10 may not be electrically connected to the shield 26 when connected to an article of merchandise M. In this case, another one of the conductors 24 in the connector 10 may be utilized to determine whether a security event has occurred since the conductors are incapable of defining a sense loop with the shield 26. In one example, a conductor 24, such as a data or signal conductor, may be used for communicating with the controller 18 and/or the article of merchandise M. Thus, a sense loop may be defined over a single conductor. A change in the value of a signal (e.g., a voltage level) transmitted between the conductor and the controller 18 and/or the article of merchandise M may be indicative of a security event. Alternatively, the signal may be transmitted between the article of merchandise and the controller 18, and should the value change, the controller may determine that a security event has occurred. In one embodiment, the connector 10 is a standard connector (e.g., a micro-USB connector) such that any conventional or proprietary connector may be used without the need to alter the conductors and/or connector for detecting various security events.

The foregoing has described one or more embodiments of a connector for securing an article of merchandise from theft. Those of ordinary skill in the art will understand and appreciate that numerous variations and modifications of the invention may be made without departing from the spirit and scope of the invention. Accordingly, all such variations and modifications are intended to be encompassed by the appended claims.

That which is claimed is:

1. A connector for providing security to an article of merchandise, the connector comprising:
a connection portion configured to be inserted within and engage an input port of the article of merchandise, the connection portion comprising:
a plurality of conductors; and
a conductive shield surrounding the plurality of conductors,
wherein at least one of the plurality of conductors is a ground conductor not electrically connected to the conductive shield and at least one other of the plurality of conductors when the connection portion is not engaged with the input port of the article of merchandise, and
wherein the at least one ground conductor is configured to electrically connect to the conductive shield and the at least one other of the plurality of conductors to define a sense loop when the connection portion is engaged with the input port of the article of merchandise, and
wherein interruption of the sense loop is indicative of a security event.

2. The connector according to claim 1, wherein at least a pair of the plurality of conductors are configured to transmit power between the connector and the article of merchandise.

3. The connector according to claim 1, wherein the connection portion comprises the plurality of conductors and the conductive shield.

4. The connector according to claim 1, wherein the connection portion is proprietary and is only compatible with a corresponding proprietary input port on the article of merchandise.

5. The connector according to claim 1, wherein the connection portion is configured to be electrically connected with the article of merchandise in different orientations.

6. The connector according to claim 1, further comprising a sensor that is configured to detect engagement with, or disengagement from, the input port of the article of merchandise.

7. The connector according to claim 6, wherein the sensor is operably engaged with the connection portion.

8. The connector according to claim 6, wherein the sensor is a plunger switch.

9. The connector according to claim 6, wherein the sensor is a flexible circuit.

10. The connector according to claim 9, wherein the flexible circuit is configured to flex into engagement with and disengagement from the connection portion in response to the connection portion being engaged with or disengaged from the article of merchandise, respectively.

11. The connector according to claim 1, further comprising a processor configured to communicate with the article of merchandise.

12. A cable assembly comprising the connector of claim 1, the cable assembly comprising a cord configured to operably engage an alarm unit, wherein the connection portion is configured to be connected to the cord.

13. A method for securing an article of merchandise comprising:
engaging a connector to an input port of an article of merchandise for providing power and data signals therebetween, the connector comprising a plurality of conductors and a conductive shield surrounding the plurality of conductors, at least one of the plurality of conductors comprising at least one ground conductor that is not electrically connected to the conductive shield and at least one other of the plurality of conductors when the connector is not engaged with the input port of the article of merchandise, the conductive shield electrically connecting to the at least one ground conductor and the at least one other of the plurality of conductors to define a sense loop when the connector is engaged with the input port of the article of merchandise.

\* \* \* \* \*